Jan. 8, 1929.
S. H. MORTENSEN
1,698,556
ALTERNATING CURRENT MOTOR
Original Filed June 10, 1922
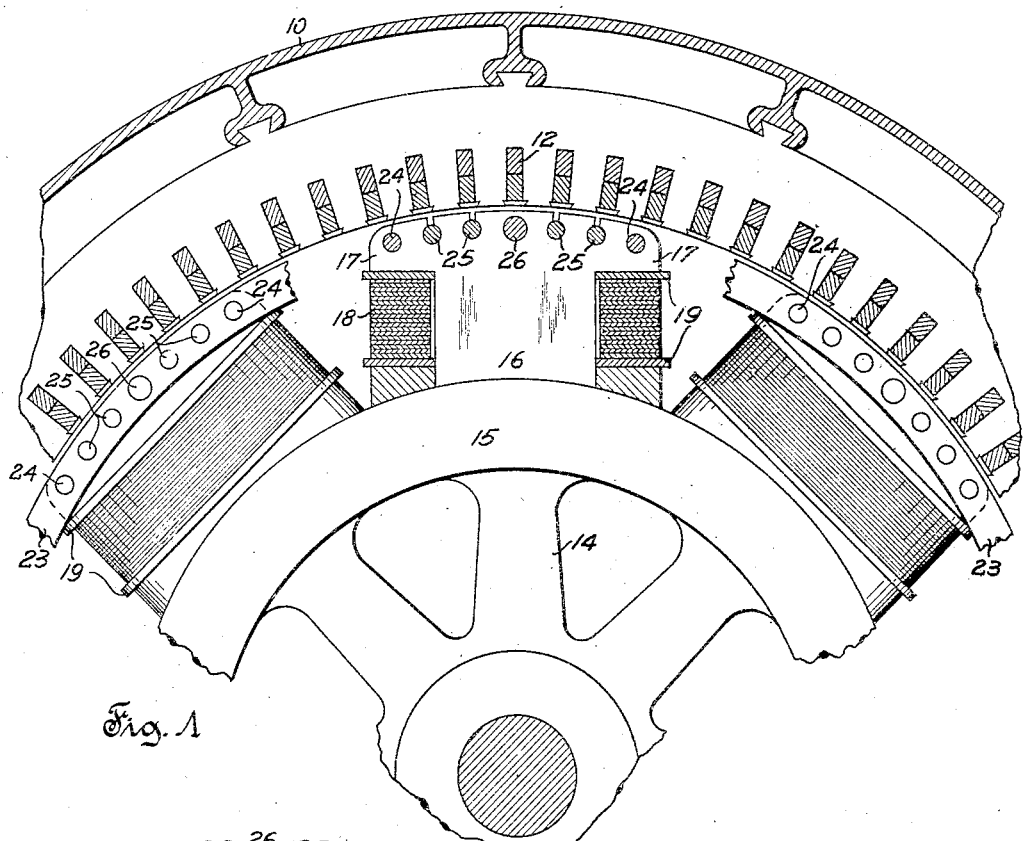
Fig. 1
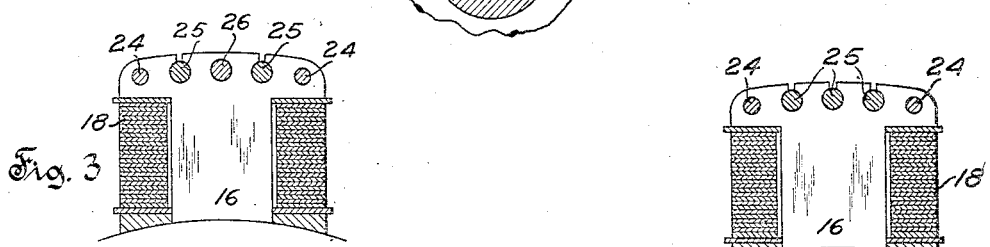
Fig. 3
Fig. 4
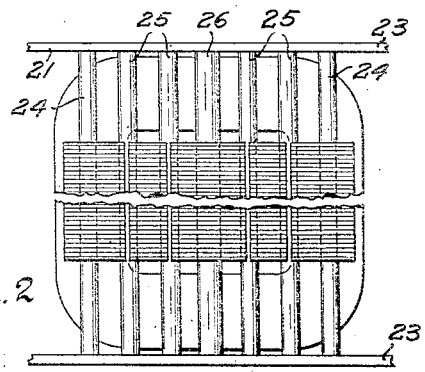
Fig. 2
Inventor
S. H. Mortensen
by
Attorney Patented Jan. 8, 1929.

1,698,556

UNITED STATES PATENT OFFICE.

SOREN H. MORTENSEN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

ALTERNATING-CURRENT MOTOR.

Application filed June 10, 1922, Serial No. 567,249. Renewed January 24, 1925.

This invention relates in general to alternating current motors and has particular relation to synchronous alternating current motors wherein closed-circuit windings are utilized for improving the starting characteristics of the motor or for preventing or limiting hunting or oscillations in the speed of the motor.

In the design and construction of alternating current motors embodying a closed-circuit winding on an element acting as the secondary of the motor, either for starting purposes only or for both starting and normal running purposes, it is especially desirable that the winding be of a type which insures the production of high starting torque without too great current drawn from the supply line and also the required running torque under conditions of maximum efficiency.

In view of the fact that synchronous alternating current motors will not start as such, under any considerable load, it has been the practice to provide such motors with a closed-circuit winding on the direct current field element of the motor, this winding acting, during starting of the motor, like the secondary winding of an induction motor when alternating current is supplied to the alternating current element of the motor. This closed-circuit winding, ordinarily of squirrel-cage form, on a synchronous motor may fulfill the same function as a squirrel-cage winding on an induction motor, inasmuch as it produces a starting torque when alternating current is supplied to the stator of the motor; and in addition to this function, this winding will also act as a damper endeavoring to prevent the motor from swinging or hunting with respect to the primary field in the stator.

Because the design and construction of a closed-circuit winding for synchronous motors which gives the best characteristics as to starting torque, has the least effect in pulling the motor into synchronism and maintaining the motor at synchronous speed against any tendency to hunt or oscillate, the actual design of commercial types of synchronous motors has been very much of a compromise which offers only fair results in the matter of a combination of increased starting torque and improved damping effects. This arises from the fact that a relatively high resistance winding is desired for the purpose of producing maximum starting torque, whereas a winding of relatively low resistance is required in order to produce maximum damping effects and for pulling the motor into synchronism during the starting operation.

On comparison of the torque effects of ordinary commercial forms of synchronous and induction motors during the starting operation, it is found that, for the same input, the torque of the synchronous motor may be greater than that of the induction motor up to about 50 percent of synchronous speed. The torque of the synchronous motor then falls off until at about 90 percent of synchronous speed, it may not be half as great as that of an induction motor of the same rating. Beyond this point, the torque of the synchronous motor becomes feeble in comparison with that of the induction motor until about 92 or 93 percent of synchronous speed is attained and the motor is excited by direct current, when the torque rises abruptly to full strength. It is customary to speak of the torque exerted in bringing the motor from this speed value (92 or 93 percent of synchronous speed) up to actual synchronous speed as the "pull in" torque.

For general purposes, the better practice includes starting a synchronous motor with the direct current field winding short-circuited, preferably through a resistance, thus decreasing the possibility of destructive effects of induced high potential in the winding. However, the current induced in this closed-circuit direct current winding has a variable torque-producing effect during the starting operation, this torque effect being positive, that is, assisting the starting, and variable for speeds of the motor up to substantially 50 percent of synchronous speed, and being negative and variable above this latter speed. The final probable result of this method of starting is a variable increase in the starting torque beyond that due to the squirrel-cage winding alone, for speeds less than 50 percent of synchronous speed and a variable decrease in such torque for speeds above the latter value, this decrease in available torque being quite noticeable in the region of speed approximating 60 to 80 percent of synchronous speed.

This invention includes among its features, the utilization of the desirable effects arising from starting with the direct current field winding of a synchronous motor short-circuited, and at the same time preventing or limiting any undesirable effects that might otherwise be due to this winding. Useful results in accordance with this invention may be secured in a synchronous motor having a direct current field element provided with an auxiliary, closed-circuit winding, preferably in the form of a single squirrel-cage, composed of end connecting devices and cross bars through the polar portions of the field element, these cross bars being of different resistances and reactances, the general arrangement being such as to provide circuits of relatively high impedance available at the lower speeds during starting and of relatively low resistance and whose axes are disposed at substantial angles, preferably right angles, to the axes of the adjacent direct current windings, so as to co-operate with the latter to a considerable degree, for torque producing-purposes at the higher speeds during the starting operation, and greatly increasing the torque available at regions of speed where, in the ordinary design of synchronous motors, there is only relatively little torque available. In carrying out the broad principle of the invention, highly desirable results are secured where a single squirrel-cage winding is mounted on the field element of the motor, this winding including cross-bars of low resistance and high reactance in the edges or tips of the field poles and bars of higher resistance and lower reactance intermediate the low resistance bars located adjacent the tips of each pole.

As an additional feature, this invention includes the utilization of one or more low resistance, high reactance bars adjacent the centers of field poles and primarily for the purpose of securing maximum damping effects without any considerable sacrifice of starting torque, in addition to the low resistance bars adjacent the tips of the poles, the bars intermediate the low resistance bars at the centers and tips of the poles being of relatively high resistance.

It is an object of this invention to provide an alternating current motor of improved design and construction embodying a closed-circuit winding on one element of the motor and including cross bars of different electrical characteristics arranged in interlaced relation.

It is a further object of this invention to provide a synchronous motor of improved design and construction and embodying a closed-circuit winding on the direct current field element of the motor capable of exerting maximum starting torque both at standstill and at the higher speeds, while still capable of exerting maximum effect in preventing hunting or oscillations in speed.

It is a further object of this invention to provide an improved design and construction of synchronous motor of this general character embodying a closed-circuit winding on the direct current element of the motor, this winding including cross-bars of low resistance and high reactance adjacent the tips of field poles and cross-bars of higher resistance nearer the centers of the field poles.

It is a further object of this invention to provide an improved design and construction of synchronous motor embodying a closed-circuit winding for the direct current element of the motor, this winding including cross-bars of low resistance adjacent the tips of the field poles and adjacent the centers of the poles and cross-bars of higher resistance intermediate the low resistance bars.

These and other objects and advantages are attained by this invention, various novel features of which will be apparent from the description and drawings, disclosing one embodiment of such invention, and will be particularly pointed out in the claims.

In the accompanying drawings:

Figure 1 is a partially sectional fragmental side elevation of a synchronous motor embodying features of this invention.

Figure 2 is a fragmental plan view of the upper side of the rotating field element of the motor of Fig. 1.

Figure 3 is a fragmental view similar to Fig. 1, showing a modified arrangement of the conductors of the closed-circuit winding.

Figure 4 is a view similar to Fig. 3, showing a further modification.

As disclosed in the drawings, the stator 10 of the motor comprises a supporting frame carrying a laminated core which is slotted at its inner periphery, a distributed alternating current winding 12, ordinarily of the polyphase type, being suitably held in position in the slots by wedges or otherwise. The rotor 13 of the motor comprises a spider 14, or other support carried by the shaft, and a rim-like element 15 of magnetic material which is included in the magnetic circuit of the rotor. A plurality of definite polar portions in the form of spaced poles of ordinary construction, preferably laminated, are secured to the rim 15, each of these poles including a radially extending body portion 16 and tips 17 adjacent the polar face of the pole. A winding 18 is mounted in operative position on each of the poles, being held against unpliant supporting plates 19 located beneath the pole tips, and, if desired, at the base of the pole. The relatively stiff supporting plate 19 is, in the ordinary design of synchronous motor, in the form of an annular collar about the pole and of metal of relatively low resistance, primarily that it may have a damper effect during operation of the motor at synchronous speed. However, in order to obtain maximum effective torque at the higher speeds during the starting operation, where the torque is ordinarily relatively small, the supporting collars 19 are made electrically discontinuous, if constructed of metal, or are constructed of substantially non-conductive material.

A closed-circuit winding 21 is disposed in operative position adjacent the polar faces of the field poles. This winding comprises end connecting devices, in the form of end rings 23, usually of brass and each in a single piece or a plurality of united sections, and cross bars extending through the face portions of the poles, as indicated being equidistant from the axis of the rotor, and connected at their ends, by riveting, brazing, or otherwise, to the end rings, so as to be securely united in both a mechanical and electrical manner to such rings. These cross bars extending through the field poles are of different characters as to resistance and, likewise, are of different reactance because of their different arrangements in the material of the poles.

The bars 24, located within or adjacent the pole tips 17 or circumferential edges of the poles, are of copper or other low resistance material, and are preferably fully embedded in the material of the poles, so as to have considerable reactance. Bars 25 located between the two low resistance bars 24 in the pole tips are of brass or other material whose resistance is considerably higher than that of the bars 24. These bars 25 are disposed in partially open slots, as indicated, to reduce the reactance of the bars. The arrangement of conductors described is such as to give the effect of a closed-circuit winding whose cross-bars are substantially equidistant from the axis of rotation of the motor, with the bars 24 in the pole tips of relatively low resistance and high reactance and other intermediate bars of relatively high resistance and low reactance. All of these intermediate bars may be of relatively high resistance, as indicated in Fig. 4, or, as shown in Figs. 1 and 3, one or more bars 26 at or nearest to the center or axis of the pole, may be of copper or other low resistance material, and, as in the case of the bars 24, fully embedded in the material of the pole so as to have considerable reactance. The specific arrangements of Figs. 1 and 3 are especially desirable where maximum damping effect is particularly desired in the operation of the motor.

In starting a synchronous motor of the character described, the starting action is similar to that of an induction motor, alternating current being applied to the stator winding. While the rotor is at stand-still, the frequency of the current induced in the closed-circuit winding is the same as that of the primary current. Hence, the reactance of the cross bars 24, and also the bar 26, if the latter is incorporated in the closed-circuit winding structure, which are substantially wholly surrounded by the material of the poles, is a maximum, and these bars carry decreased current and contribute a substantial torque-producing effect on the rotor. The combined torque-producing effect of the low resistance bars and the higher resistance bars 25 is a relatively large one which may readily be approximately as great as that of an induction motor of ordinary design of the same rating as the synchronous motor. As the speed of the motor increases, the frequency of the secondary current decreases and, hence, the reactance of the secondary circuit decreases. The speed of the motor continues to rise, ordinarily with more or less decrease in available torque, until the speed reaches a value well toward 95 percent of synchronous speed, the exact value being dependent upon the resistance of the closed-circuit winding, at which time direct current is applied to the field winding and the motor is pulled into synchronism.

During the starting operation, the annular collars 19, if continuous and of relatively low resistance, and the closed-circuited direct current windings surrounding the poles have considerable current induced therein, and these elements produce single-phase magnetic fields whose torque-producing effects vary from a maximum positive value to a maximum negative value, the latter effect occurring probably when the speed of the motor is from 60 to 80 percent of synchronous speed. Due to the fact that the reactance of the bars 24 decreases and the current flowing in these bars increases as the speed of the motor increases, pairs of these bars, one on each of the adjacent poles, along with the connecting portions of the end rings, form low resistance paths which produce magnetic fields whose axes are spaced substantially 90 degrees from the axes of the magnetic field produced in the direct current poles by the windings thereabout. The result of the current flowing in the several angularly spaced short-circuited paths of the field element is the production of a polyphase magnetic field whose components are these two fluxes 90 degrees apart. The torque-producing effect of this flux is such as to greatly increase the available torque on the motor at the higher speeds during the starting operation, beyond what would be present if these low resistance winding elements were omitted.

Aside from the effect of increasing the available torque on the motor at the regions of speed where the starting torque is a minimum, these low resistance bars have the additional effect of serving as damper windings when the motor is operating at synchronous speed. These desirable effects, arising most probably from the fact that these low resistance paths are of high reactance and most advantageously located, are secured in a motor of the character described without appreciable decrease in the torque available at stand-still and the lower starting speeds.

In the modification shown in Fig. 3, there is an interlaced arrangement made up of a low resistance bar 26 at the center of the pole and one low resistance bar 24 at each of the pole tips, these bars being of high reactance so as to insure a satisfactory torque-producing effect thereof at the lower speeds. Between the low resistance bars 24 and 26 are located high resistance, low reactance bars 25, similar to the bars 25 of Fig. 1. The use of one or more low resistance bars at the centers of the poles is ordinarily desirable where it is desired that the winding shall be capable of producing maximum damping effects in the operation of the motor.

In Fig. 4 is shown a further modification of the arrangement of the cross-bars of the closed-circuit winding. This winding is substantially the same as that of Fig. 3, the difference being that the low resistance bar 26 at the center of the pole in Fig. 3 is replaced by a high resistance, low reactance bar 25 similar to the other bars 25, damping effects being secured substantially through the low resistance bars 24 located in the pole tips. The specific arrangement disclosed in Fig. 4 may be more desirable where the attainment of maximum starting torque is of considerable greater importance than the attainment of maximum damping effects.

It will be apparent that there is disclosed herein a design and construction of synchronous motor having a closed-circuit winding associated with the field element of the motor and including an interlaced arrangement of bars of different resistances, and preferably of different reactances, which permits the attainment of maximum torque during starting and maximum damping effect during running at synchronous speed, or any desired combination of the two effects, this combination of effects being considerably beyond what has been attainable in the past with the known types of closed-circuit winding on the field element of the motor.

It will be apparent that it is not desired that the invention claimed be limited to the exact details of construction shown and described, for obvious modifications will occur to a person skilled in the art.

It is claimed and desired to secure by Letters Patent:

1. A synchronous motor, comprising an element having definite polar portions, and a closed-circuit winding for said element comprising end connecting devices adjacent said polar portions, and bars electro-magnetically associated with said polar portions and connected to said end connecting devices, bars adjacent the edges of said polar portions being of higher reactance than bars nearer the centers of said polar portions.

2. A synchronous motor, comprising an element having definite polar portions, and a closed-circuit winding for said element comprising end connecting devices adjacent said polar portions, and bars passing through said polar portions and connected to said end connecting devices, bars adjacent the circumferential edges of said polar portions being of lower resistance and higher reactance than bars nearer the centers of said polar portions.

3. A synchronous motor, comprising an element having definite polar portions, and a closed-circuit winding for said element comprising bars passing through said polar portions and located at substantially the same distance from the axis of rotation of said motor, and end connecting devices connected to said bars, certain of said bars being of higher resistance and lower reactance than others of said bars.

4. A synchronous motor, comprising an element having definite polar portions, and a closed-circuit winding for said element comprising end connecting devices adjacent said polar portions, and bars passing through said polar portions and located at substantially the same distance from the axis of rotation of said motor and connected to said end connecting devices, bars adjacent the edges of said polar portions being of lower resistance and higher reactance than bars nearer the centers of said polar portions.

5. A synchronous motor, comprising an element having definite polar portions, and a combined starting and damping winding for said motor including bars extending transversely through said polar portions adjacent the faces thereof and substantially equidistant from the axis of rotation of said motor, and devices for interconnecting said bars, certain of the bars adjacent the edges and the centers of said polar portions being of relatively low resistance, and bars intermediate said center and edge bars being of higher resistance than said center and edge bars.

6. A synchronous motor, comprising an element having definite polar portions, and a combined starting and damping winding for said motor including bars extending transversely through said polar portions adjacent the faces thereof and substantially equidistant from the axis of rotation of said motor, and devices for interconnecting said bars, bars adjacent the edges and the centers of said polar portions being of relatively low resistance and high reactance, and bars intermediate said center and edge bars being of higher resistance and lower reactance than said center and edge bars.

7. A synchronous motor, comprising an element having definite polar portions, and a combined starting and damping winding for said motor including bars extending transversely through said polar portions adjacent the faces thereof and substantially equidistant from the axis of rotation of said motor, and devices for interconnecting said bars, bars adjacent the edges of said polar portions being of relatively low resistance and high reactance, and bars intermediate said first mentioned bars being of relatively high resistance.

8. A synchronous motor, comprising an element having definite polar portions, and a combined starting and damping winding for said motor including bars extending transversely through said polar portions adjacent the faces thereof and substantially equidistant from the axis of rotation of said motor, and devices for interconnecting said bars, certain of said bars being of relatively low resistance and high reactance and others of said bars being of relatively high resistance, and bars of one class being disposed in interlaced relation with respect to bars of the other class.

9. A synchronous motor, comprising an element having definite polar portions, and a combined starting and damping winding for said motor including bars extending transversely through said polar portions adjacent the faces thereof and substantially equidistant from the axis of rotation of said motor, and devices for interconnecting said bars, certain of said bars being of relatively low resistance and high reactance and others of said bars being of relatively high resistance and low reactance, and bars of one class being disposed in interlaced relation with respect to bars of the other class.

10. An alternating current synchronous motor comprising a core element having a winding adapted to produce definite polar portions, and a closed-circuit winding for said element comprising end connecting devices, and bars electromagnetically associated with said polar portions and connected to said end connecting devices, bars adjacent the centers of said polar portions being of lower resistance than bars nearer the edges of said polar portions.

11. An alternating current synchronous motor, comprising a rotary core of magnetic material having a winding adapted to produce definite polar portions, conducting elements of relatively low resistance extending transversely through the definite polar portions of said core and having their corresponding ends electrically interconnected, and other conducting elements of higher resistance than said first elements and having their axes at the same distance from the axis of rotation of said machine as the axes of the conducting elements of said first group are disposed, the conducting elements of the second group associated with the several polar portions being spaced from and symmetrically disposed at the sides of individual conductors of said first group and electrically interconnected therewith at the ends thereof.

12. An alternating synchronous motor comprising a core element having a winding adapted to produce definite polar portions, and closed circuit winding elements for said core element comprising bars electromagnetically associated with said polar portions and constituting a plurality of short circuit paths of definite resistances, certain of said bars adjacent the centers of said polar projections being of lower resistance than other bars remote from said centers.

13. A synchronous motor, comprising an armature, a field member, and conducting bars extending transversely through the field member at points equidistant from the axis of rotation of said motor and having their corresponding ends interconnected, bars nearest the polar centers of the field member being of substantially lower resistance than bars further away from said centers.

14. A synchronous motor, comprising a slotted core of magnetic material, and a closed-circuit winding therefor comprising end connecting devices and a plurality of conducting portions electrically associated therewith and disposed in the slots of said core with their axes substantially parallel to and equidistant from the axis of rotation of said motor, certain individual ones of said conducting portions being disposed between and substantially equidistant from other adjacent conducting portions of higher resistance.

15. An alternating current motor, comprising a core of magnetic material provided with slots, and a closed-circuit winding therefor comprising a plurality of sets of conducting elements having electrically dissimilar characteristics disposed in the slots of said core and substantially equidistant from the axis of rotation thereof, individual conducting elements of one set being each disposed between a pair of symmetrically arranged conducting elements of the other set and spaced therefrom through the intermediary of magnetic material.

16. An alternating current motor, comprising a rotary core of magnetic material having conducting elements of relatively low resistance extending transversely of said core and having their corresponding ends electrically interconnected, and other conducting elements of higher resistance than said first elements and having their axes at the same distance from the axis of rotation of said motor as the axes of the conducting elements of said first group are disposed, pairs of conducting elements of the second group being each spaced from and symmetrically disposed at opposite sides of individual conductors of said first group and electrically interconnected therewith at the ends thereof.

In testimony whereof, the signature of the inventor is affixed hereto.

SOREN H. MORTENSEN.